US008452735B2

(12) United States Patent
Mandagere et al.

(10) Patent No.: US 8,452,735 B2
(45) Date of Patent: May 28, 2013

(54) SELECTING A DATA RESTORE POINT WITH AN OPTIMAL RECOVERY TIME AND RECOVERY POINT

(75) Inventors: Nagapramod S. Mandagere, San Jose, CA (US); Ramani Ranjan Routray, San Jose, CA (US); Sandeep Madhav Uttamchandani, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/787,988

(22) Filed: May 26, 2010

(65) Prior Publication Data

US 2011/0296237 A1 Dec. 1, 2011

(51) Int. Cl.
G06F 7/00 (2006.01)
G06F 17/00 (2006.01)
G06F 11/00 (2006.01)

(52) U.S. Cl.
USPC ............................................ 707/674; 714/15

(58) Field of Classification Search
None
See application file for complete search history.

(56) References Cited

U.S. PATENT DOCUMENTS

| | | | |
|---|---|---|---|
| 6,199,178 B1 | 3/2001 | Schneider et al. | |
| 6,647,512 B1 | 11/2003 | James et al. | |
| 6,732,293 B1 | 5/2004 | Schneider | |
| 7,328,366 B2 | 2/2008 | Michelman | |
| 7,784,098 B1 * | 8/2010 | Fan et al. | 726/25 |
| 2007/0038895 A1 | 2/2007 | Biegert et al. | |
| 2009/0106327 A1 * | 4/2009 | Dilman et al. | 707/202 |
| 2009/0106603 A1 * | 4/2009 | Dilman et al. | 714/42 |
| 2011/0029494 A1 * | 2/2011 | Blitzer et al. | 707/694 |

OTHER PUBLICATIONS

Corner, Mark D. et al., "Zero-Interaction Authentication", MOBICOM '02, Sep. 23-28, 2002, ACM 1-58113-486-X/02/0009, pp. 1-11.
Corner, Mark D. et al., "Protecting File Systems with Transient Authentication", Wireless Networks 11, pp. 7-19, 2005.
Wang, H.J. et al., "Automatic Misconfiguration Troubleshooting with PeerPressure", OSDI '04: 6th Symposium on Operating Systems Design and Implementation, Berkeley, CA, USA: USENIX Assoc., 2004, pp. 245-257.
Lao, N. et al., "Combining High Level Symptom Descriptions and Low Level State Information for Configuration Fault Diagnosis", Proc. of the 18th Conference on System Administration, 2004 LISA XVIII, Nov. 14-19, 2004, Atlanta, GA, pp. 151-158.
Cohen, I. et al., "Capturing, Indexing, Clustering, and Retrieving System History", SOSP '05, Oct. 23-26, 2005, Brighton, ACM 2005, pp. 105-118.

(Continued)

Primary Examiner — Cheryl Lewis
Assistant Examiner — Raheem Hoffler
(74) Attorney, Agent, or Firm — Mohammed Kashef

(57) ABSTRACT

Embodiments of the invention relate to selecting a data restore point with an optimal recovery time and recovery point. An exemplary embodiment includes generating a problem search criterion for an entity with corrupted data. Dependencies relied on by the entity to function are determined. At least one event signature match is found that comprises information for an event being logged in an event log, and is associated with the dependencies. At least one data restore point created prior to an occurrence of a particular event in the at least one event signature match is selected. The particular event having caused the data to be corrupted. The at least one data restore point is selected to restore data to a storage system with the corrupted data.

20 Claims, 8 Drawing Sheets

OTHER PUBLICATIONS

Redstone, J.A. et al., "Using Cmputers to Diagnose Computer Problems", HotOS IX: The 9th Workshop on Hot Topics in Operating Systems, May 18-21, 2003, Lihue, HI, USA, pp. 91-96.

Uttamchandani, S. et al., "Chameleon: a self-evolving, fully-adaptive resource arbitrator for storage systems", 2005 USENIX Annual Technical Conference, ATEC '05, pp. 75-88.

Lomb, C.R. et al., "Facade: virtual storage devices with performance guarantees", 2nd USENIX Conference on File and Storage Technologies, Fast 2003, pp. 131-144.

Karlsson, M. et al., "Triage: Performance Isolation and Differentiation for Storage Systems", International Workshop on Quality of Service, IWQoS, 2004, pp. 67-74.

Chambliss, D.D. et al., "Performance virtualization for large-scale storage systems", Proceedings of the 22nd International Symposium on Reliable Distributed Systems, SRDS 2003, pp. 109-118.

\* cited by examiner

| Signature ID 502 | Event Code 504 | Event Entity Type 506 | Event Description 508 | Event Category 510 | Signature Score 512 |
|---|---|---|---|---|---|
| A | B | C | D | E | F |

FIG. 5A

| Signature ID of Cause Event 514 | Signature ID of Effect Event 516 | Time Window 518 | Correlated Description 520 | Signature Category 522 | Signature Score 524 |
|---|---|---|---|---|---|
| G | H | I | J | K | L |

FIG. 5B

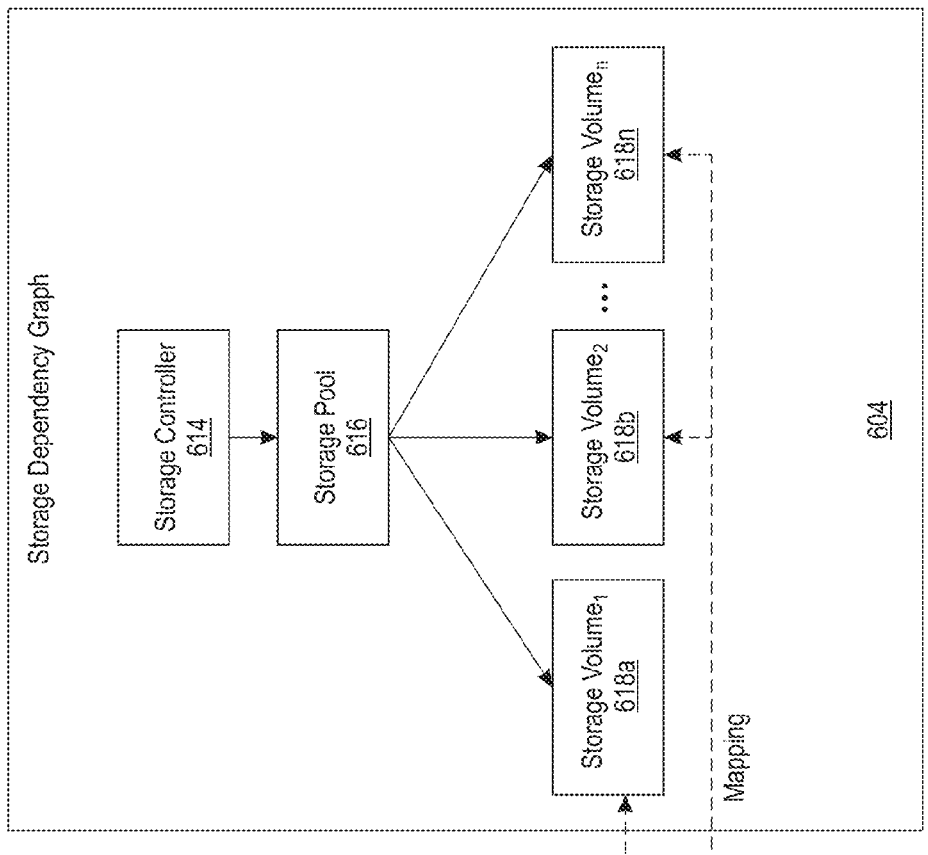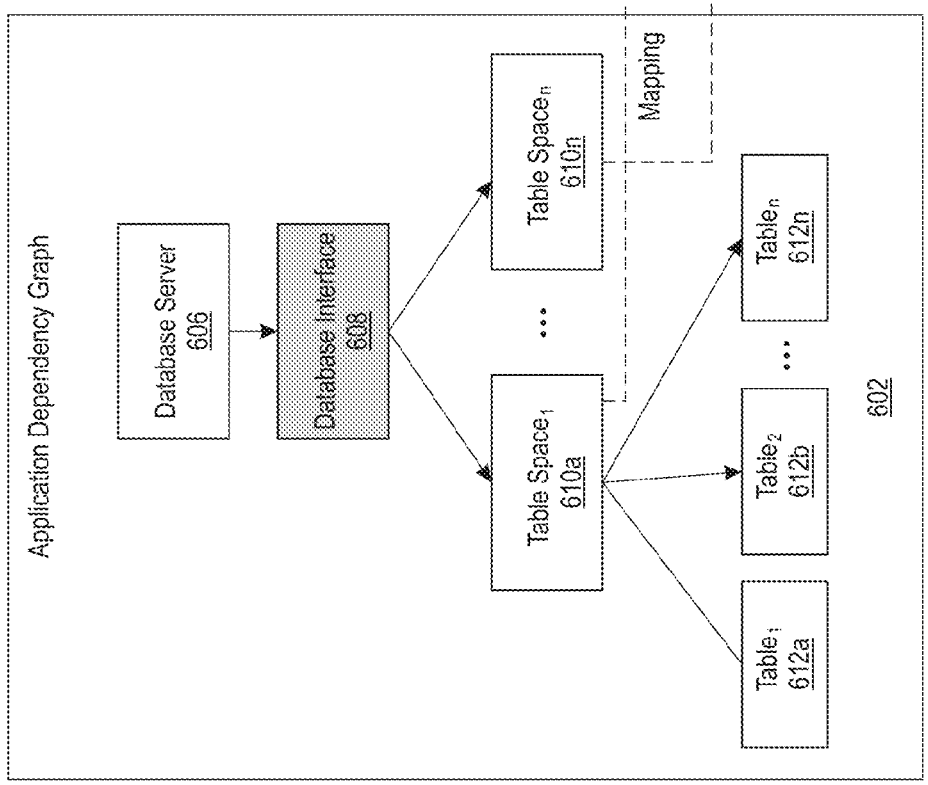
FIG. 6

| Data Restore Point(s): Timestamp(s) (Data Restore Point Score 0 - 100) 702 | Event Time(s): Event(s) 704 |
|---|---|
| Snapshot$_a$ : Date/Time$_a$ (Score$_a$: xx) | Event$_{a11}$ Time: Event$_{a11}$<br>Event$_{a12}$ Time: Event$_{a12}$<br>Event$_{a2}$ Time: Event$_{a2}$ |
| Snapshot$_b$ : Date/Time$_b$ (Score$_b$: xx) | Event$_{b1}$ Time: Event$_{b1}$<br>Event$_{b2}$ Time: Event$_{b2}$ |
| ⋯ | |
| Snapshot$_n$ : Date/Time$_n$ (Score$_n$: xx) | Event$_n$ Time: Event$_n$<br>⋮<br>Event$_{nm}$ Time: Event$_{nm}$ |

SELECTING A DATA RESTORE POINT WITH AN OPTIMAL RECOVERY TIME AND RECOVERY POINT

BACKGROUND

Embodiments of the invention relate to the field of data storage, and in particular, to selecting a data restore point with an optimal recovery time and recovery point.

Business critical enterprise applications suffer data loss and downtime from event failures encountered by a system associated with such applications. Data corruption is a common cause of application data loss and downtime. Data corruption may result from a data variable's value(s) becoming incorrect, deleted, or unreadable. Inconsistent value(s) being may be caused by human configuration errors, physical media errors, storage controller failures, firmware errors, logical software bugs, virus attacks, or malicious worms.

A point-in-time copy of data is a copy of the state of a storage device at a given point-in-time. For example, storage systems take periodic (e.g., every ½ hour) snapshots or point-in-time copies of data stored on the storage system. Point-in-time copies of data are used to restore data, when a primary copy of data on the storage device is lost or corrupted. A point-in-time copy of a data volume may be a logical copy of the data volume, also referred to as a snapshot, when only the changed data blocks are maintained. A point-in-time copy of a data volume can also be a physical copy of the data volume, also referred to as a clone, when a complete copy of the data volume is created on the same or a different set of physical disks.

Point-in-time copies of data are used for backing up high-availability systems that enable efficient system and data recovery. A point-in-time copy of data may be used to revert back to data at a previous satisfactory state to resolve a data error in the primary copy of data. System administrators currently try the most recent point-in-time copies of data for a data restore, manually one by one, until a consistent point-in-time copy of data is found. System administrators start with the latest point-in-time copy and continue to earlier point-in-time copies of data, until a non-corrupt version of the data is found. Each point-in-time copy of data is tested for consistency to determine whether the point-in-time copy of data is corrupt. As a result, data restore requires repeating manual mounting and testing of each point-in-time copy until a valid point-in-time copy of data is found.

System administrators may also manually review event logs to determine a root-cause of data corruption and manually select a point-in-time copy for recovery based on the root-cause. For example, various components (e.g., storage controller, a server's operating system) in an end-to-end system associated with a point-in-time copy of data log events in event logs. Manual examination of event logs typically requires reviewing of a large number of event logs because of the amount of components in an end-to-end system and an amount of time that could have lapsed from an event causing the corruption. In addition, manual examination of event logs requires domain knowledge of complex enterprise systems.

BRIEF SUMMARY

Preferred embodiments of the invention relate to selecting a data restore point with an optimal recovery time and recovery point. An aspect of the invention is a system for selecting a data restore point. The system includes a dependency generator that receives a problem search criterion for an entity with corrupted data, and determines dependencies relied on by the entity to function. The system further includes an event analyzer coupled to the dependency generator. The event analyzer finds at least one event signature match for the problem search criterion. The at least one event signature match comprises information for an event logged in a event log, and is associated with the entity's dependencies. The system further includes a restore advisor coupled to the event analyzer. The restore advisor selects a data restore point created prior to an occurrence of a particular event in the at least one event signature match for restoring data to a storage system with the corrupted data. The particular event had caused the data to become corrupted.

Another aspect of the invention is a method for selecting a data restore point with an optimal recovery time and recovery point. The method includes generating a problem search criterion for an entity with corrupted data. The method further includes determining dependencies relied on by the entity to function. The method further includes finding at least one event signature match. The at least one event signature match comprises information for an event logged in an event log, and is associated with the dependencies. The method further includes selecting at least one data restore point created prior to an occurrence of a particular event in the at least one event signature match for restoring data to a storage system with the corrupted data. The particular event had caused the data to become corrupted.

Another aspect of the invention is a computer program product for selecting a data restore point with an optimal recovery time and recovery point. The computer program product includes a computer readable storage medium having computer readable program code embodied therewith. The computer readable program code includes computer readable program code to receive a problem description query for an entity with corrupted data, parse the problem description query, and generate a problem search criterion based on information parsed from the problem description query. The computer readable program code further includes computer readable program code to determine dependencies relied on by the entity to function.

The computer readable program code further includes computer readable program code to find at least one event signature match associated to the problem search criterion. The at least one event signature match includes information for an event logged in an event log, and is associated with the dependencies. The computer readable program code further includes computer readable program code to select at least one data restore point created prior to an occurrence of a particular event in the at least one event signature match for restoring data to a storage system with the corrupted data. The particular event had caused the data to become corrupted.

These and other, features, aspects, and advantages of the present invention will be apparent with reference to the following detailed description and appended claims.

BRIEF DESCRIPTION OF THE SEVERAL VIEWS OF THE DRAWINGS

FIG. 5A illustrates a single event signature, according to one embodiment;

FIG. 5B illustrates a correlated event signature, according to one embodiment;

FIG. 6 shows an exemplary application dependency graph and storage dependency graph, according to one embodiment;

FIG. 7 illustrates an output of a system for selecting a data restore point with an optimal recovery time and recovery point, according to one embodiment.

DETAILED DESCRIPTION

Embodiments of the invention relate to selecting a data restore point with an optimal recovery time and recovery point. The recovery time for a data restore is the amount of time elapsed from the start of a data restore to completion of the data restore with valid data. The recovery point is a representation of data loss incurred from a restore of valid data, according to one embodiment. For example, the recovery point is based on changes to data from a data restore point to the current version of the data, which became corrupted. According to embodiments of the invention, the data restore point represents storage system snapshots, clones, point-in-time copies of data, mirrors, data backups, and continuous data protections (CDP).

According to an embodiment of the present invention, event logs are received from systems that have data backed up or replicated. Information from the event logs is stored in database tables and indices. The indices are used to match event signatures efficiently. The database tables are used to store event log information reliably. The event signatures capture an association of events logged in event logs and potential root causes of the events.

A system administrator is provided with an interface for describing a data corruption problem for an entity with corrupted data. For example, an entity represents an application-level instance with a data integrity issue (e.g., database$_1$, database table$_1$). The data corruption problem description is used to create a problem description query. The problem description query is parsed and converted into a problem search criterion for selecting a data restore point(s) with an optimal recovery time and recovery point. Entity dependency graphs are generated for dependencies relied on by the entity to function. The dependencies are at different levels in an end-to-end system associated with the entity (e.g., application-level dependencies, storage-level dependencies and system-level dependencies). The dependency graphs filter out irrelevant entities for efficient and accurate signature matching.

Event signatures are matched to the problem search criterion based on the entity's dependencies and event log information received from a system associated with the data corruption. Potential data restore points are selected based on the events that are matched with the event signature(s). A data restore point score is generated for each selected data restore point based on the likelihood that the selected data restore point will not have corrupted data and how recent the select data restore point is. The data restore point with the highest score is recommended to be used to restore data to the storage system having the corrupted data.

Figure 1:
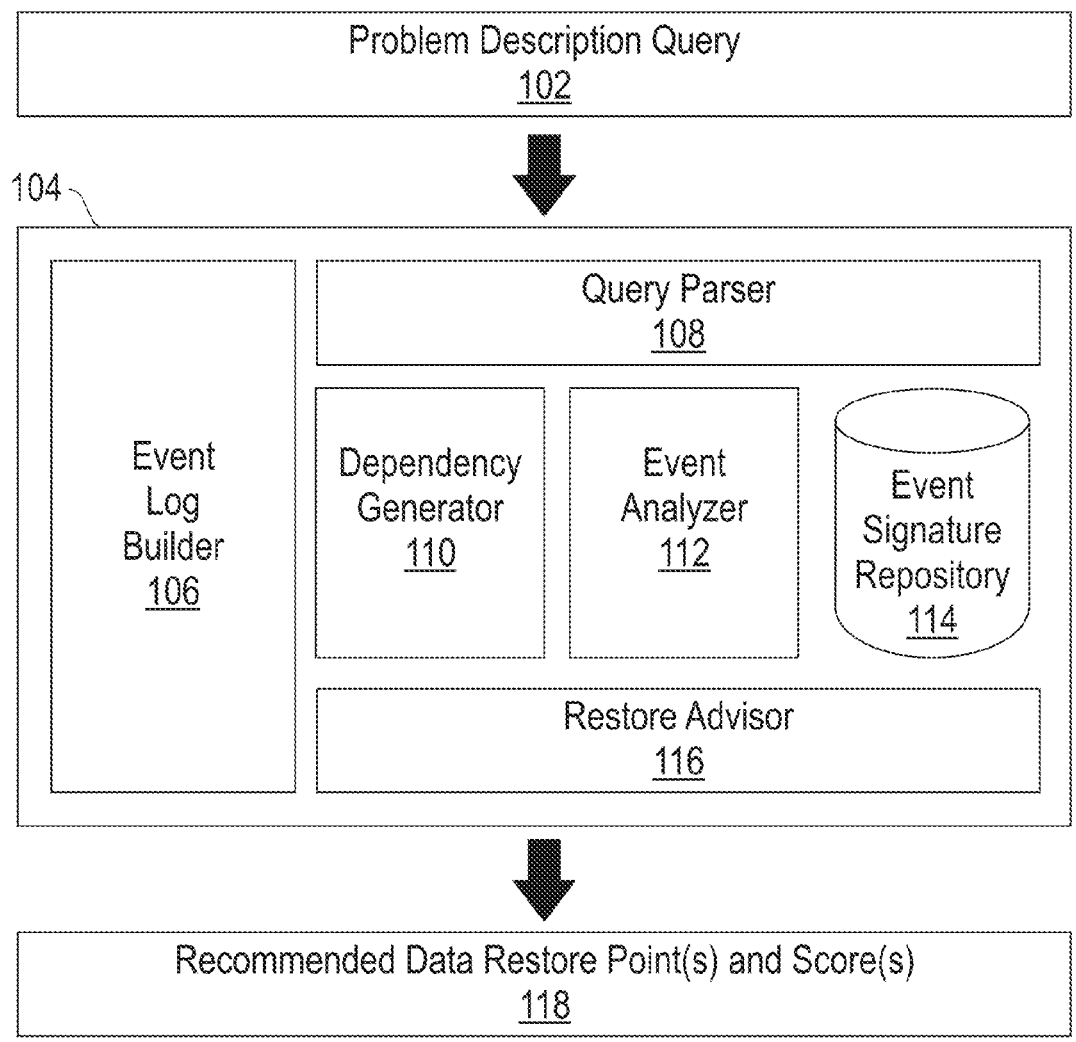
FIG. 1 is a diagram of a system for selecting a data restore point with an optimal recovery time and recovery point, according to one embodiment.

Referring now to FIG. 1, which is a diagram of a system 104 for selecting a data restore point with an optimal recovery time and recovery point, according to one embodiment. A problem description query 102 is received by system 104. The system 104 includes an event log builder 106, a query parser 108, a dependency generator 110, an event analyzer 112, an event signature repository 114, and a restore advisor 116. The system 104 outputs recommended data restore point(s) and data restore point score(s) 118.

Figure 2:
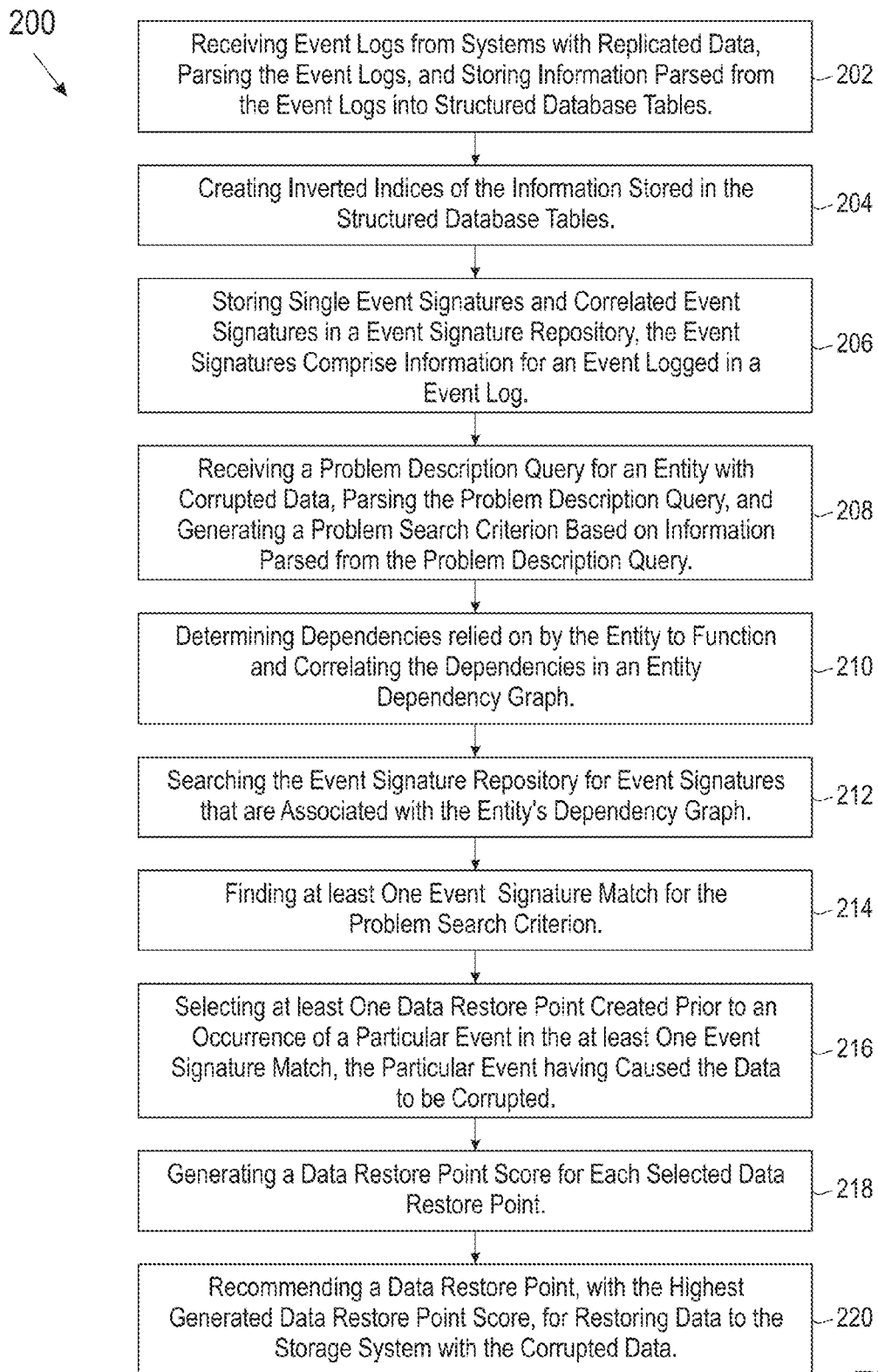
FIG. 2 is a flow chart of a method for selecting a data restore point having an optimal recovery time and recovery point, according to one embodiment.

FIG. 2 is a flow chart of a method for selecting a data restore point having an optimal recovery time and recovery point, according to one embodiment. In step 202, event logs from systems with replicated data are received. The event logs are parsed, and information parsed from the event logs is stored into structured database tables. The event log builder 106 receives event logs from systems with replicated data, parses the data in the event logs, and stores information parsed from the event logs into structured database tables. For example, an event log may comprise a set of event sequences, represented by values, which describe events associated with an activity traced by an application, operating system, or system component. Various types of event logs in an end-to-end system are received by the event log builder 106. Event logs from applications (e.g., database event logs), host operating systems (OS), host bus adapters (HBA), fiber channel (FC) switches, and storage controllers are received by the event log builder 106.

In step 204, inverted indices for information stored in the structured database tables are created. In one embodiment, the event log builder 106 builds inverted indices for information stored in the structured database tables. In an exemplary embodiment, the event log builder 106 builds Lucene indices of information parsed from the event logs received. For example, a Lucene index is a data structure that looks up text stored inside the index quickly for enabling efficient text searching. Lucene indices are constructed by documents, whereby each document corresponds to a unique textual document ID, and contains fields comprising a name and a value.

In step 206, single event signatures and correlated event signatures are stored, in which the event signatures comprise information for events logged in event logs. The event signature repository 114 stores single event signatures and correlated event signatures. According to one embodiment, the single event signatures comprise information of a single event logged in an event log. According to another embodiment, the correlated event signatures comprise information correlated from at least two events logged in at least one event log. For example, the correlated event signatures capture an association of events, such as effects and their possible causes, from event logs. In one embodiment, event signatures are manually provided based on expert experience. In another embodiment, event signatures are automatically mined from past data corruptions encountered.

In step 208, a problem description query for an entity with corrupted data is received, the problem description query is parsed, and a problem search criterion is generated based on information parsed from the problem description query. The query parser 108 receives a problem description query for an entity with corrupted data, parses the problem description query, and generates a problem search criterion based on information parsed from the problem description query.

In an exemplary embodiment, the query parser 108 uses Natural Language Processing (NLP) to parse the problem description query. For example, NLP is an automated technique that parses or converts narrative documents into a coded form that is appropriate for computer based analysis. The query parser 108 may use a dictionary-based approach to extract entities associated with a data corruption problem (e.g., Database Table 1), failure types and timelines from the problem description query. In this case, the query parser 108 divides the problem description query using part-of-speech tagging, according to transition rules learned from data mining technology. Alternatively, the query parser 108 automatically completes an incomplete query, based on a word list, by performing a spell check against a dictionary, and making auto-recommendations based on mined association probabilities between the entity and the failure type.

In step 210, dependencies relied on by the entity to function are determined and the dependencies are correlated in an entity dependency graph. For example, the dependencies are at different levels in an end-to-end system associated with the entity. In one embodiment, the dependency generator 110 determines the entity's application-level dependencies, system-level dependencies, and storage-level dependencies relied on by the entity to function. In another embodiment, the dependency generator 110 correlates the dependencies in an entity dependency graph. For example, the dependency graph captures relationships of dependencies among entities.

In one embodiment, an application-level dependency is a direct relationship between two or more entities (e.g., tables, tablespaces and instances in a database application) of the application. For example, in a database application, one of its tablespace (e.g., tablespace1) contains a few tables (e.g., table1, table2 and table3) and belongs to one of its database instances (e.g., dbinst1). In another embodiment, a storage-level dependency is a direct relationship between entities (e.g., volumes, pools and controller) in a storage system. For example, a storage pool (e.g., pool1) contains a few storage volumes (e.g., volume1 and volume2), and belongs to one of storage controllers (controller1). In one embodiment, the correlation between an application dependency and a storage dependency is a direct relationship among certain entities of the application and certain entities of the storage system. For example, a database tablespace (tablespace1) resides on a few storage volumes (volume1 and volume2). In another embodiment, a system-level dependency is a direct relationship between two or more entities. For example, a system-level dependency includes an application being dependent on an operating system (OS) running on a system hosting the application.

In step 212, event signatures that are associated with the queried entity's dependency graph are searched. In one embodiment, the event analyzer 112 searches the event signature repository 114 for event signatures associated with the queried entity's application dependencies and the storage dependencies. In an exemplary embodiment, the event analyzer 112 conducts a multi-stage search to minimize event signature matching overhead. For example, the intuition for multi-stage search is that good signature matches are more common at lower (finer) entity levels due to less noise. The event analyzer 112 progressively expands the search to entities at higher (coarse) level to capture potential signature matches at higher level, if no matches are found at lower levels. In another embodiment, the event analyzer 112 quickly searches for single signature matches using the indices (e.g., Lucene indices), and then efficiently searches for correlated signature matches between two single signature matches using data structures (e.g., hashtables).

In one embodiment, the dependency graphs are divided into two parts based on a heuristic for a two-stage search. For example, the part for first stage search includes the queried entity, successors of the queried entity, mapped entity(ies) in the other side (e.g., application-level or storage-level), and successors of mapped entity(ies). Entities in dependency graphs that are excluded in the first stage search will be searched at second stage search, if the first stage search cannot find signature matches with high event score.

In one embodiment, the event analyzer 112 searches for single event signature matches in the event signature repository 114. For example, for each single event signature in event signature repository 114, the event analyzer 112 finds the event signature's candidate entities (e.g., Database Tablespace 1 and Database Tablespace 2) in dependency graphs based on the event's entity type of the event signature. The event analyzer 112 then forms a Lucene query based on the candidate entities, the event code, and event description of the event signature for finding events that match the event signature. In another embodiment, the event analyzer 112 searches for correlated event signature matches in the event signature repository 114. For example, the event analyzer searches for correlated signature matches to find a pair of events (e.g., a cause event and an effect event) that matches with a correlated signature.

In one embodiment, the event analyzer 112 builds a correlation data structure (e.g., hashtable) for all correlated event signature matches. For example, a data structure key for the data structure is the signature ID of a cause event in a correlated event signature and a value is the whole correlated event signature that includes a signature ID of an effect event and a time window. In another embodiment, the event analyzer 112 also builds an effect-event data structure (e.g., hashtable) for all effect event candidates which are all single signature match events. For example, the data structure key is the signature ID of an effect event candidate (or the signature ID of a single signature match event), and a value is the whole single signature. In one embodiment, for each single signature matching event, the event analyzer 112 references the correlation data structure using the matched event signature's ID.

The event analyzer 112 gets the signature ID of the effect event for the matched correlated signature, and then looks up the effect event in the data structure using the signature ID of the effect event, if there is a match in the correlation data structure. The single event signature match events contain both the cause event and the effect event for the correlated event signature, if there is a match in the effect-event data structure. In one embodiment, the event analyzer 112 determines whether the cause event and effect event occurred within a specified time window of the correlated signature. These two single signature match events form a correlated signature match, if the cause event and effect event occurred within a specified time window of the correlated signature.

In step 214, at least one event signature match for the problem search criterion is found. In one embodiment, the event analyzer 112 matches at least one event signature in the event signature repository 114 with the problem search criterion. For example, the problem search criterion comprises problem description information, which includes an entity with corrupted data, a type of error encountered by the entity, and a time when the error occurred. In an exemplary embodiment, the event analyzer 112 matches at least one event signature searched for in the event signature repository 114 with the problem search criterion.

In step 216, at least one data restore point is selected that was created prior to an occurrence of a particular event in the at least one signature match event. The particular event had caused the data to become corrupted. In one embodiment, the restore advisor 116 selects at least one data restore point created prior to an occurrence of a particular event in the at least one signature match event. The data restore is for restoring data to a storage system with the corrupted data. For example, the restore advisor 116 selects the potential data restore points based on events matched with event signatures. In one embodiment, the data restore point created before an event matched with a single event signature is selected. In another embodiment, the data restore points created before a cause event matched in a correlated event signature is selected.

In step 218, a data restore point score is generated for each selected data restore point. In one embodiment, the data restore point score is based on the expected data loss percentage and the combination of the signature match scores for all signature matches corresponding to the selected data restore point. In one embodiment, the expected data loss percentage represents the expected data loss that would be incurred if the selected data restore point were used to restore data. In another embodiment, the expected data loss percentage is based on changes to the data being restored.

In one embodiment, the signature match score of a signature match is calculated based on the time decay factor and the match factor of the signature match. In an exemplary embodiment, the time decay factor quantifies how recent the event in the event signature match is related to the time window for the problem description query 102. In another embodiment, the time decay factor is based on how much time elapsed from an occurrence of an event in the event signature match to an occurrence of the entity's data being corrupted.

In another embodiment, the match factor of a signature match is based on the importance of the matched event and how specific that match event is. In an exemplary embodiment, the importance of an event in an event signature match may be based on the type of event, the correlation of that event with other events, and the signature score of the matched signature. For example, the match factor typically decreases from an error to a warning to an informational event. The match factor of a correlated event signature match will be higher than the match factor of a single event signature match. In an exemplary embodiment, how specific an event is may be based on how related the entity in the event is to the entity associated with the data corruption in problem description query 102, based on the dependencies. For example, the match factor typically increases when the entity in the matched event and the entity in the problem description query are closer in the dependency hierarchy.

In step 218, a data restore point with the highest generated data restore point score for restoring data to the system having the corrupted data is recommended for restoring data to the storage system having the corrupted data. In one embodiment, the restore advisor 116 recommends the data restore point for restoring data to the system with the corrupted data. In an exemplary embodiment, the restore advisor 116 recommends the data restore point with the highest generated data restore point score.

Figure 3:
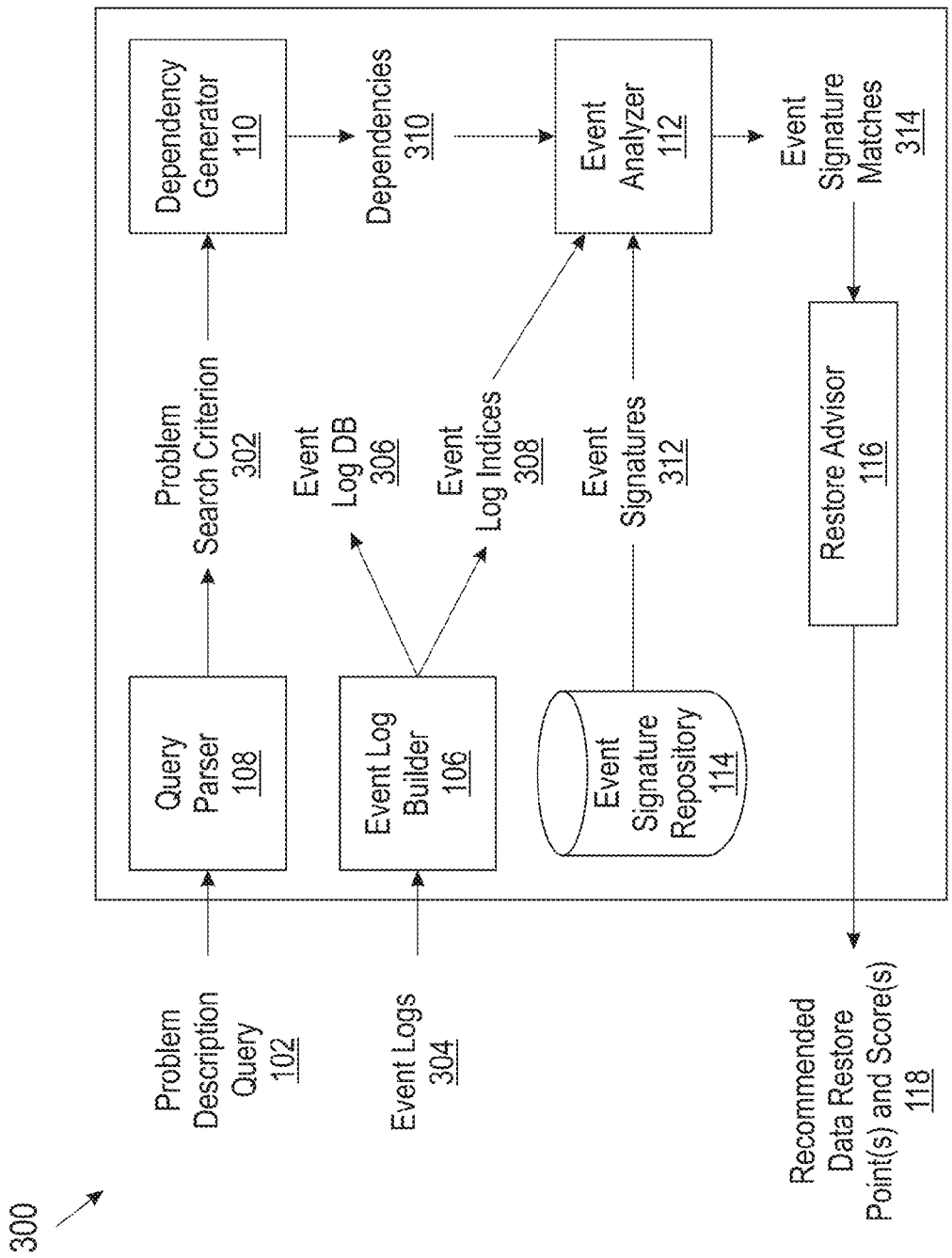
FIG. 3 is a more detailed diagram of the system shown in FIG. 1, according to one embodiment.

FIG. 3 is a more detailed diagram of the system 104 shown in FIG. 1, according to one embodiment. The system 300 comprises a query parser 108. In one embodiment, the query parser 108 receives the problem description query 102 for an entity with corrupted data. The query parser 108 parses the problem description query 102 and generates a problem search criterion 302 based on information parsed from the problem description query 102.

The system 300 further comprises an event log builder 106. In one embodiment, the event log builder 106 receives semi-structured event logs 304 from systems with replicated data, parses the semi-structured event logs 304, and stores information parsed from the semi-structured event logs 304 into structured database tables in an event log database 306. In another embodiment, the event log builder 106 creates event log indices 308 comprising information stored in the event log database 306.

The system 300 further comprises an event signature repository 114. In one embodiment, the event signature repository 114 stores event signatures comprising single event signatures and correlated event signatures. According to an exemplary embodiment, the single event signatures comprise information of a single event from an event log 304, and the correlated event signatures comprise information correlated from two or more events from at least one event log 304.

The system 300 further comprises a dependency generator 110. The dependency generator 110 is coupled to the query parser 108. In one embodiment, the dependency generator 110 receives the problem search criterion 302 for the entity with corrupted data, and determines the entity's dependencies at different levels in an end-to-end system associated with the entity. For example, the application dependencies and the storage dependencies are relied on by the entity to function. In one embodiment, the dependency generator 110 creates an entity dependency graph correlating the application dependencies and the storage dependencies.

The system 300 further includes an event analyzer 112. The event analyzer 112 is coupled to the event log builder 106, the dependency generator 110, and the event signature repository 114. In one embodiment, the event analyzer 112 searches the event log indices 308 to identify event log information associated with the entity's application dependencies and the storage dependencies 310. The event log information from the event log indices 308 is used to match at least one single event signature 312 to the problem search criterion 302. For example, the event analyzer 112 searches the event signature repository 114 for event signature matches 314 associated with the entity's application dependencies and the storage dependencies 310 based on the event log information identified from the event log indices 308. In one embodiment, single event signatures are searched by event analyzer 112, and if at least two events match with single event signatures 312, the correlated event signatures 312 are searched by event analyzer 112.

The system 300 further includes a restore advisor 116. The restore advisor 116 is coupled to the event analyzer 112. In one embodiment, the restore advisor 116 selects at least one data restore point created prior to an occurrence of a particular event in the at least one event signature match 314. The particular event had caused the data to become corrupted. In another embodiment, the restore advisor 116 generates a data restore point score 118 for each selected data restore point.

According to an exemplary embodiment, the data restore point score 118 is generated by combining the signature match scores of the corresponding (at least one) signature match 314. The signature match score of a signature match is calculated based on the time decay factor and the match factor of the signature match. The time decay factor is based on how much time elapsed from an occurrence of an event in the at least one event signature match 314 to an occurrence of the entity's data being corrupted. The match factor of a signature match is based on the importance of the matched event and how specific that match event is. In another embodiment, the restore advisor recommends a data restore point 118 with the highest generated data restore point score, to restore data to a system with the corrupted data.

Figure 4:
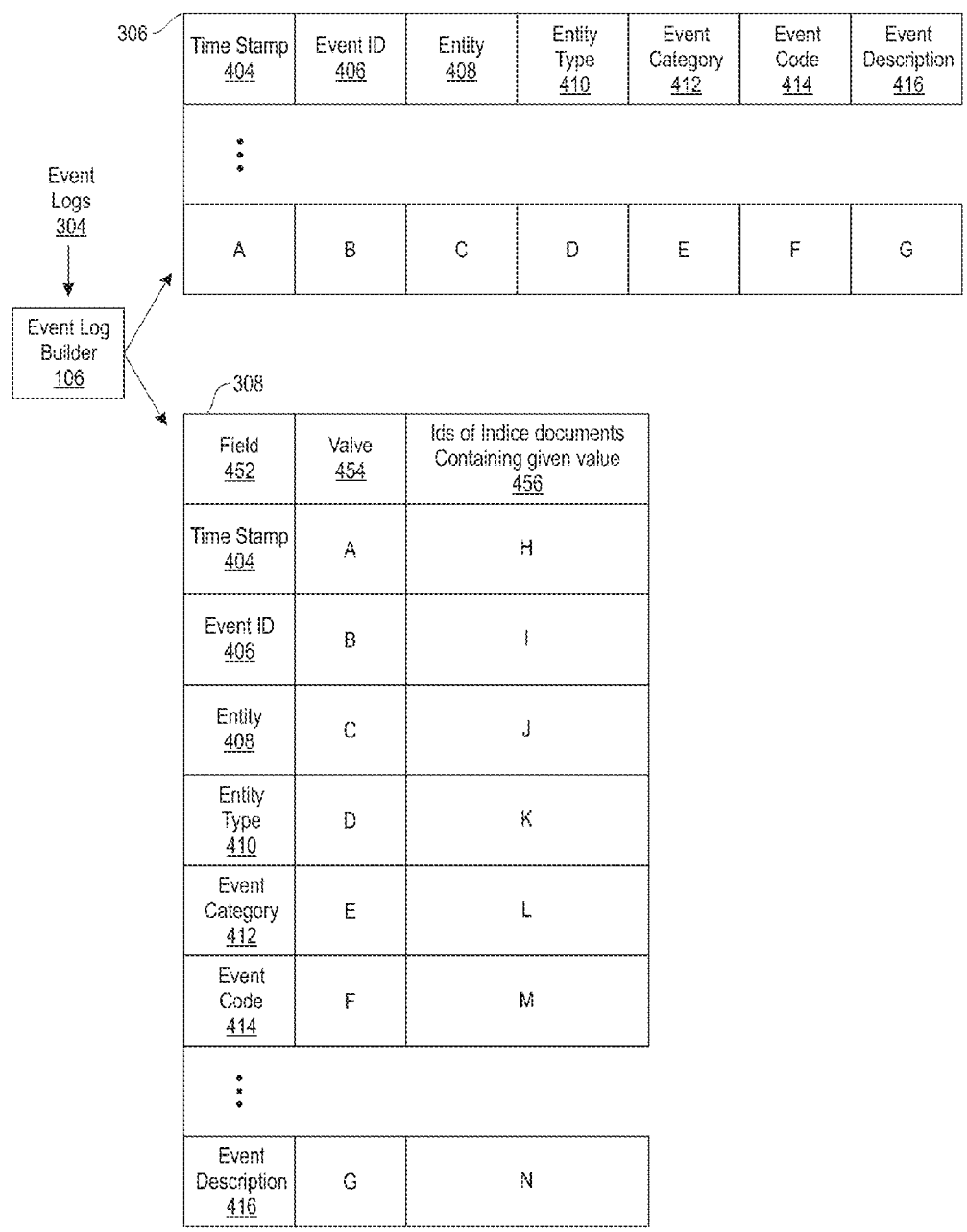
FIG. 4 is a database table and an index for storing event information extracted from event logs, according to one embodiment.

FIG. 4 is a database table 306 and an index 308 for storing event information extracted from event logs 304, according to one embodiment. In one embodiment, the event log builder 106 receives the event logs 304 and stores information parsed from the event logs 304 into the database table 306. In another embodiment, the database table 304 is structured and comprises timestamp information 404, an event ID 406, an entity name 408, an entity type 410, an event category 412, an event code 414, and an event description 416.

In another embodiment the event log builder 106 builds an index 308 from information stored in the database table 402. In an exemplary embodiment, the index 308 comprises a field 452, a value 454 for a field, and ids of index documents containing a given value 456. In an exemplary embodiment, the field entries 452 may comprise timestamp information 404, an event ID 406, an entity name 408, an entity type 410, an event category 412, an event code 414, and an event description 416.

FIG. 5A illustrates a single event signature 500, according to one embodiment. The single event signature 500 comprises a signature ID 502, an event code 504, an event entity type 506, an event description 508, an event category 510, and a signature score 512. In an exemplary embodiment, the event description 508 comprises a description of the event information in the single event signature 500. The event category 510 comprises the type of event that was logged (e.g., fatal, error, warning). The event signature score 512 comprises a value indicating how confident this signature is mapped to a problem.

FIG. 5B illustrates a correlated event signature 550, according to one embodiment. In one embodiment, the correlated event signatures comprise information correlated from two single event signatures. The correlated event signature comprises a signature ID of a cause event 514, a signature ID of a effect event 516, a time window 518, a correlated signature description 520, a signature category 522, and a signature score 524. For example, the time window 518 comprises an amount of time elapsed between the events in the correlated event signature occurred.

FIG. 6 shows an exemplary application dependency graph 602 and a storage dependency graph 604, according to one embodiment. The exemplary dependencies are for a problem description query on a database instance 608. The exemplary application dependency graph 602 includes the database instance 608. The database instance 608 belongs to the database server 606, the database instance 608 contains tablespace$_1$ 610a ... tablespace$_n$ 610n, and tablespace$_1$ 610a contains table$_1$ 612a, table$_2$ 612b ... table$_n$ 612.

The exemplary storage dependency graph 604 includes storage volume$_1$ 618a, storage volume$_2$ 618b ... storage volume$_s$ 618n which are used by database tablespace$_1$ 610a ... tablespace$_n$ 610n. The storage volume$_s$ 618a, storage volume$_2$ 618b ... storage volume$_s$ 618n belong to a storage pool 616 which belongs to a storage controller 614. In one embodiment, the dependency generator 110 first finds a predecessor(s) and a successor(s) of the queried entity (e.g., database instance 608) in the entity's own side (e.g., application side). The dependency generator 110 then finds the mapped entity(ies) in another side and then finds the predecessors and successors of the mapped entity(ies) in another side (e.g., storage side). In an exemplary embodiment, the queried entity is database instance 608. For example, database instance 608 belongs to the database server 606 and contains tablespace$_1$ 610a ... tablespace$_n$ 610n, table$_s$ 612a, table$_2$ 612b ... table$_n$ 612, and mapped entities in storage side are storage volume$_s$ 618a, storage volume$_2$ 618b storage volume$_s$ 618n which belong to a storage pool 616 which belongs to a storage controller 614.

FIG. 7 illustrates an output 700 of a system for selecting a data restore point with an optimal recovery time and recovery point, according to one embodiment. In an exemplary embodiment, the output 700 includes selected data restore points: Timestamp (the score for a restore point 0-100) 702, and event time(s): event(s) 704 associated with the selected data restore points 704, according to one embodiment. In one embodiment, the data restore point score represents a confidence indicator based on the likelihood that there will not be data corrupted in the selected data restore point. For example, a score of 100 illustrates a low likelihood of corrupted data, whereas a score of 0 illustrates a high likelihood of corrupted data.

In one embodiment, Event Time(s): Event(s) 704 represents logged events and time the event occurred. The event(s) are associated with the selected data restore point 702. For example, the event(s) may include a disk failure, a volume failure, table I/O error, server added, delete pattern. In one embodiment, a recommended data restore point: timestamp (score 0-100) 702 represent a selected data restore point(s). According to one embodiment, the timestamp represents the point-in-time the selected data restore point(s) was created.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
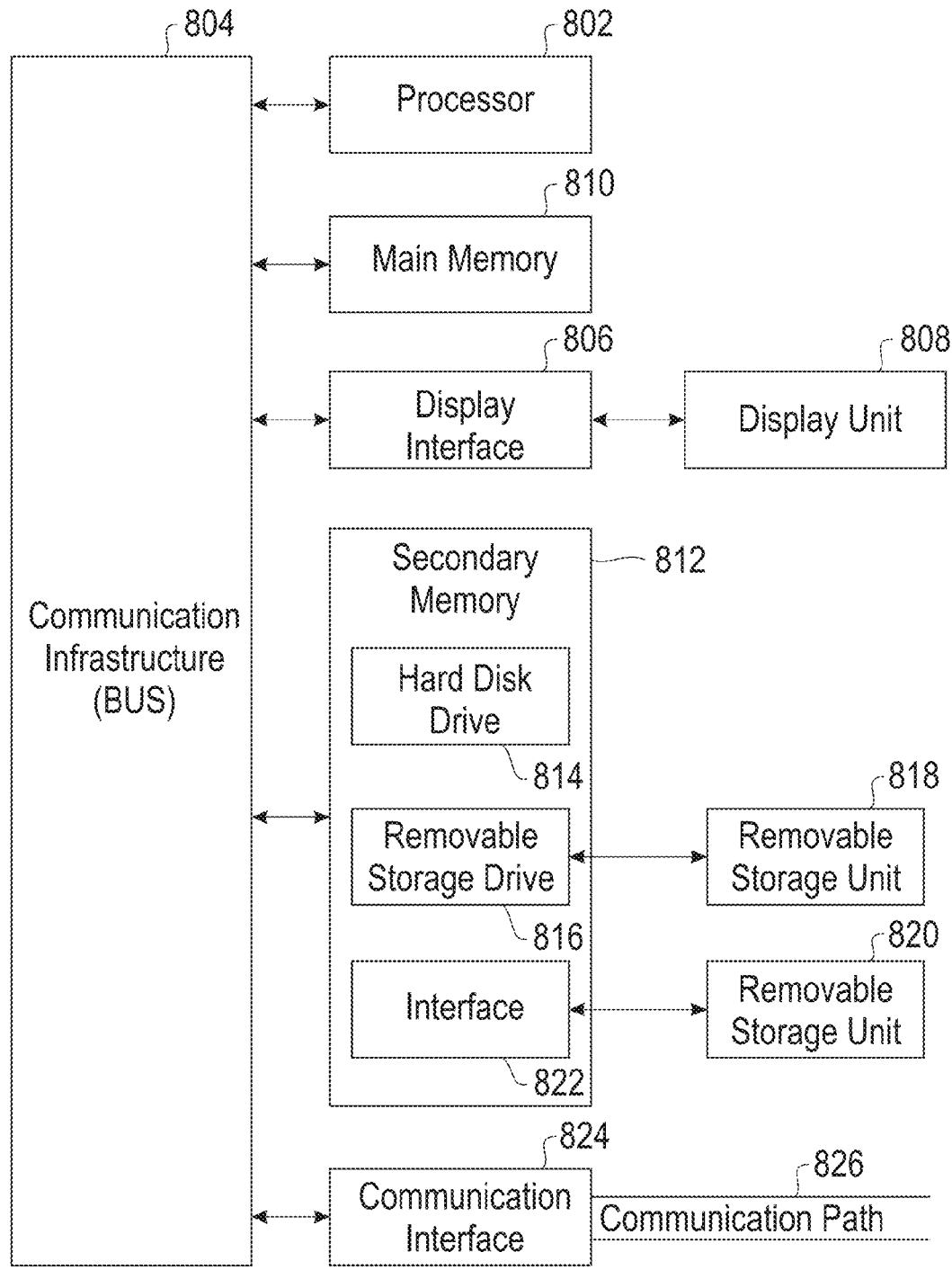
FIG. 8 is a high level block diagram showing an information processing system useful for implementing an embodiment of the present invention.

FIG. 8 is a high level block diagram showing an information processing system useful for implementing an embodiment of the present invention. The computer system includes one or more processors, such as a processor 802. The processor 802 is connected to a communication infrastructure 804 (e.g., a communications bus, cross-over bar, or network).

The computer system can include a display interface 806 that forwards graphics, text, and other data from the communication infrastructure 804 (or from a frame buffer not shown) for display on a display unit 808. The computer system also includes a main memory 810, preferably random access memory (RAM), and may also include a secondary memory 812. The secondary memory 812 may include, for example, a hard disk drive 814 and/or a removable storage drive 816, representing, for example, a floppy disk drive, a magnetic tape drive, or an optical disk drive. The removable storage drive 816 reads from and/or writes to a removable storage unit 818 in a manner well known to those having ordinary skill in the art. Removable storage unit 818 represents, for example, a floppy disk, a compact disc, a magnetic tape, or an optical disk, etc., which is read by and written to by removable storage drive 816. As will be appreciated, the removable storage unit 818 includes a computer readable medium having stored therein computer software and/or data.

In alternative embodiments, the secondary memory 812 may include other similar means for allowing computer programs or other instructions to be loaded into the computer system. Such means may include, for example, a removable storage unit 820 and an interface 822. Examples of such means may include a program package and package interface (such as that found in video game devices), a removable memory chip (such as an EPROM, or PROM) and associated socket, and other removable storage units 820 and interfaces 822 which allow software and data to be transferred from the removable storage unit 820 to the computer system.

The computer system may also include a communications interface 824. Communications interface 824 allows software and data to be transferred between the computer system and external devices. Examples of communications interface 824 may include a modem, a network interface (such as an Ethernet card), a communications port, or a PCMCIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This communications path 826 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 810 and secondary memory 812, removable storage drive 816, and a hard disk installed in hard disk drive 814.

Computer programs (also called computer control logic) are stored in main memory 810 and/or secondary memory 812. Computer programs may also be received via a communication interface 824. Such computer programs, when run, enable the computer system to perform the features of the present invention as discussed herein. In particular, the computer programs, when run, enable the processor 802 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system of selecting a data restore point with an optimal recovery time and recovery point, the recovery point being a representation of data loss incurred from a restore of valid data, comprising:
    a memory module;
    a processor; and
    a functional unit local to the memory module and in communication with the processor, the functional unit having modules to implement said selecting and are executed by the processor, the modules including:
        a dependency generator that: (i) receives a problem search criterion for an entity with corrupted data, and (ii) determines dependencies relied on by the entity to function,
        an event analyzer that finds at least one event signature match for the problem search criterion, said match includes information for an event logged in a event log and being associated with the entity's dependencies, and
        a restore advisor that selects at least one data restore point created prior to an occurrence of a particular event in the at least one event signature match for restoring data to a storage system with the corrupted data, the particular event having caused the data to be corrupted, and generates a data restore point score for each selected data restore point based on an expected data loss and a combination of event signature match scores for all event signature matches that correspond to the selected data restore point, and wherein the event signature match scores are calculated based on a time decay factor and a match factor of the event signature match, the time decay factor quantifies how recent an event in the event signature match is related to a time window for the problem search criterion, and the match factor of a event signature match is based on relevance of the matched event and the entity's relation to another entity associated with the event logged in said event log.

2. The system of claim 1, further comprising: a storage device that stores event signatures including single and correlated event signatures, the single event signatures include information of a single event logged in an event log, and the correlated event signatures include information correlating at least two events being logged in at least one event log.

3. The system of claim 2, wherein the event analyzer searches events from event logs and the event signature repository for the at least one event signature match, event signature matches are searched for and are associated with the entity's dependencies, the single event signatures are searched, and if at least two single event signature matches are found then the correlated event signatures are searched.

4. The system of claim 1, wherein the restore advisor recommends a data restore point with the highest generated data restore point score.

5. The system of claim 1, wherein the information from the single event signature is selected from the group consisting of: an event signature ID, an event code, an event description, an event category, an signature score, and an event entity type.

6. The system of claim 1, wherein the information from the correlated event signature is selected from the group consisting of: a signature ID of a cause event, a signature ID of a effect event, a description of a correlated event signature, a signature category, a signature score, and an amount of time elapsed between the events in the correlated event signature occurred.

7. The system of claim 1, wherein said modules further includes a query parser that: receives a problem description query for the entity with corrupted data, parses the problem description query, and generates the problem search criterion based on information parsed from the problem description query.

8. The system of claim 7, wherein the problem search criterion includes problem description information selected from the group consisting of: an entity with corrupted data, a type of error encountered by the entity, and a time window when data corruption could have occurred.

9. The system of claim 1, wherein said modules further includes an event log builder that: receives semi-structured event logs from a system with replicated data, parses the semi-structured event logs, and stores information parsed from the semi-structured event logs into structured database tables.

10. The system of claim 9, wherein the event log builder creates inverted indices of the information stored in the structured database tables.

11. The system of claim 1, wherein the dependency generator creates an entity dependency graph correlating the entity's dependencies, the dependencies: includes dependencies at different levels in a system associated with the entity, and are selected from the group consisting of: application dependencies, storage dependencies, and system dependencies.

12. The system of claim 1, wherein the entity is a selected from the group consisting of: an application, a computer system, and a storage system.

13. The system of claim 1, wherein the data restore point represents a storage system data replication selected from the group consisting of: a snapshot, a clone, a mirror, a continuous data protection, a backup, and a point-in-time copy of data.

14. A method of selecting a data restore point with an optimal recovery time and recovery point, the recovery point being a representation of data loss incurred from a restore of valid data, comprising:
- receiving a problem search criterion for an entity with corrupted data;
- determining dependencies relied on by the entity to function;
- finding at least one event signature match for the problem search criterion, said match includes information for an event logged in a event log, and is associated with the dependencies;
- selecting at least one data restore point created prior to an occurrence of a particular event in the at least one event signature match for restoring data to a storage system with the corrupted data, the particular event having caused the data to be corrupted; and
- generate a data restore point score for each selected data restore point based on an expected data loss and a combination of event signature match scores for all event signature matches that correspond to the selected data restore point, and wherein the event signature match scores are calculated based on a time decay factor and a match factor of the event signature match, the time decay factor quantifies how recent an event in the event signature match is related to a time window for the problem search criterion, and the match factor of a event signature match is based on relevance of the matched event and the entity's relation to another entity associated with the event logged in said event log.

15. The method of claim 14, further comprising searching events from event logs and the event signature repository for the at least one event signature match, wherein event signature matches are searched for and are associated with the entity's dependencies, the single event signatures are searched, and if at least two single event signature matches are found then the correlated event signatures are searched.

16. A computer program product of selecting a data restore point with an optimal recovery time and recovery point, the recovery point being a representation of data loss incurred from a restore of valid data, the computer program product comprising a computer readable storage medium having computer readable program code embodied therewith, said program code being executable by a computer to:
- receive a problem search criterion for an entity with corrupted data;
- determine dependencies relied on by the entity to function;
- find at least one event signature match for the problem search criterion, said match includes information for an event logged in a event log, and is associated with the dependencies;
- select at least one data restore point created prior to an occurrence of a particular event in the at least one event signature match for restoring data to a storage system with the corrupted data, the particular event having caused the data to be corrupted; and
- generate a data restore point score for each selected data restore point-based on an expected data loss and a combination of event signature match scores for all event signature matches that correspond to the selected data restore point, and wherein the event signature match scores are calculated based on a time decay factor and a match factor of the event signature match, the time decay factor quantifies how recent an event in the event signature match is related to a time window for the problem search criterion, and the match factor of a event signature match is based on relevance of the matched event and the entity's relation to another entity associated with the event logged in said event log.

17. The method of claim 14, further comprising creating an entity dependency graph correlating the entity's dependencies, the dependencies: include dependencies at different levels in a system associated with the entity, and are selected from the group consisting of: application dependencies, storage dependencies, and system dependencies.

18. The method of claim 14, further comprising recommending a data restore point with the highest generated data restore point score.

19. The computer program product of claim 16, wherein said program code is further executable by the computer to create an entity dependency graph correlating the entity's dependencies, the dependencies: include dependencies at different levels in a system associated with the entity, and are selected from the group consisting of: application dependencies, storage dependencies, and system dependencies.

20. The computer program product of claim 16, wherein said program code is further executable by the computer to recommend a data restore point with the highest generated data restore point score.

* * * * *